United States Patent [19]

Matsuda

[11] Patent Number: 5,694,584
[45] Date of Patent: Dec. 2, 1997

[54] INFORMATION PROCESSING SYSTEM CAPABLE OF QUICKLY PROCESSING A PARAMETER AND A COMMAND NECESSARY FOR DRAWING PROCESSING

[75] Inventor: Nobuko Matsuda, Tokyo, Japan

[73] Assignee: NEC Corporation, Tokyo, Japan

[21] Appl. No.: 761,864

[22] Filed: Dec. 9, 1996

Related U.S. Application Data

[63] Continuation of Ser. No. 517,561, Aug. 21, 1995, abandoned, which is a continuation of Ser. No. 112,843, Aug. 27, 1993, abandoned.

[30] Foreign Application Priority Data

Aug. 28, 1992 [JP] Japan .................... 4-230164

[51] Int. Cl.⁶ .................... G06F 15/16; G06F 15/20
[52] U.S. Cl. .................... 395/507; 395/438; 395/325; 395/131; 395/309; 395/310; 395/129; 395/332; 395/501; 395/515
[58] Field of Search .................... 395/438, 325, 395/131, 309, 310, 129, 332, 501, 507, 515

[56] References Cited

U.S. PATENT DOCUMENTS

| | | | |
|---|---|---|---|
| 4,646,075 | 2/1987 | Andrews | 340/747 |
| 4,794,524 | 12/1988 | Carberry et al. | 364/200 |
| 4,855,904 | 8/1989 | Daberkow | 364/200 |

Primary Examiner—Jack B. Harvey
Assistant Examiner—Rupal D. Dharia
Attorney, Agent, or Firm—Whitham, Curtis, Whitham & McGinn

[57] ABSTRACT

In an information processing system which is operable in response to a parameter data signal and a command data signal and which includes a pre-processor unit for preliminarily processing the parameter data signal and a drawing processor unit for executing drawing operation in accordance with the command data signal, either the drawing processor unit or the pre-processor unit has a first register section and a second register section each of which serves to store the parameter data signal and the command data signal. Contents of the first register section are transferred to the second register section to be processed by an instruction execution unit of either the drawing processor unit or the pre-processor unit.

19 Claims, 10 Drawing Sheets

INFORMATION PROCESSING SYSTEM CAPABLE OF QUICKLY PROCESSING A PARAMETER AND A COMMAND NECESSARY FOR DRAWING PROCESSING

This application is a continuation of U.S. application Ser. No. 08/517,561, filed Aug. 21, 1995, now abandoned, which is a continuation of U.S. application Ser. No. 08/112,843, filed Aug. 27, 1993, now abandoned.

BACKGROUND OF THE INVENTION

This invention relates to an information processing system for use in executing a processing operation to draw a figure or a picture.

A conventional information processing system of the type described comprises a drawing controller which is exclusively used to draw a picture or a figure and which is connected to an external host central processor unit (CPU). With this structure, the external host central processing unit issues a parameter data signal representative of a parameter necessary for drawing the picture and a command data signal indicative of a processing operation. Supplied with the parameter data signal and the command data signal, the drawing controller executes the processing operation in accordance with the command data signal to draw the figure specified by the parameter data signal at a high speed. Thus, parallel processing operations are carried out in the external host central processing unit and the drawing controller so as to improve performance in a total system including the external host central processing unit.

Moreover, consideration has been also made about dividing the drawing controller into a pre-processor unit and a drawing processor unit. In this event, the pre-processor carries out preliminary processing, such as conversion of each coordinate position into an address of an image memory, so as to draw a figure while the drawing processor unit actually draws the figure into the image memory. With this structure, it is possible to carry out parallel pipeline processing between the pre-processor unit and the drawing processor unit and to execute drawing processing at a very high speed.

More specifically, the external host central processing unit at first transfers, to the pre-processor unit, various kinds of parameters which indicate positions of a figure to be drawn, a size of the figure, a species of a line, and the like. Thereafter, the external host central processing unit issues a command which indicates a line drawing, a circle drawing, and the like. Supplied with the parameters and the command, the pre-processor unit preliminarily processes the parameters in accordance with the command to produce various processed results which may be called processed parameters.

Herein, the processed parameters must be transferred from the pre-processor to the drawing processor unit before processing is executed in the drawing processor unit. For example, when a straight line is drawn by the use of DDA (Digital Differential Analyzer) algorithm, the pre-processor unit should calculate the processed parameters, such as a drawing start address, a length of the straight line, an error term of the DDA, and a line species, and the like, and should thereafter transfer them to the drawing processor unit.

In order to carry out the above-mentioned operation, the pre-processor unit comprises a register section for storing the processed parameters and the command while the drawing processor unit also comprises a register section for storing the processed parameters transferred from the pre-processor unit. The drawing processor unit starts the processing of the processed parameters after reception of the command transferred from the pre-processor.

Thus, the pre-processor unit transfers a next following processed parameter or parameters to the drawing processor unit after the drawing processor unit finishes processing indicated by a previous command. In other words, the pre-processor unit must wait for transferring the next following processed parameters to the drawing processor unit while the drawing processor unit executes the drawing processing related to the previous command. This is because correct drawing operation can not be accomplished by the drawing processor unit when the register section of the drawing processor unit is rewritten by the pre-processor unit during the drawing processing related to the previous command.

SUMMARY OF THE INVENTION

It is an object of this invention to provide an information processing system which is capable of executing drawing processing at a very high speed by shortening a waiting time in a pre-processor unit.

It is another object of this invention to provide an information processing system of the type described, which is capable of quickly transferring a parameter and a command from an external host central processing unit to the pre-processor unit or from the pre-processor unit to a drawing processor unit.

An information processing system to which this invention is applicable comprises a first processor unit connected to a first bus and a second processor unit which is connected to the first processor unit through a second bus. Each of the first and the second processor units comprises an instruction execution unit and a register unit which stores a parameter data signal and a command data signal indicative of a processing operation executed in each of the first and the second processor units. The register unit of a selected one of the first and the second processor units comprises a first register section which is accessed by the selected one of the first and the second processor units and which is connected to a selected one of the first and the second buses to store at least the parameter data signal sent from the selected one of the first and the second buses and a second register section which is accessed by the instruction execution unit of the selected one of the first and the second processor units to transfer, together with the command data signal, the parameter data signal stored in the first register section to the second register section under control of the instruction execution unit of the selected one of the first and the second processor units and to store, as contents, the parameter data signal and the command data signal sent from the first register section. The instruction execution unit of the selected one of the first and the second processor units executes the processing operation in accordance with the contents of the second register section.

DESCRIPTION OF THE PREFERRED EMBODIMENTS

Figure 1:
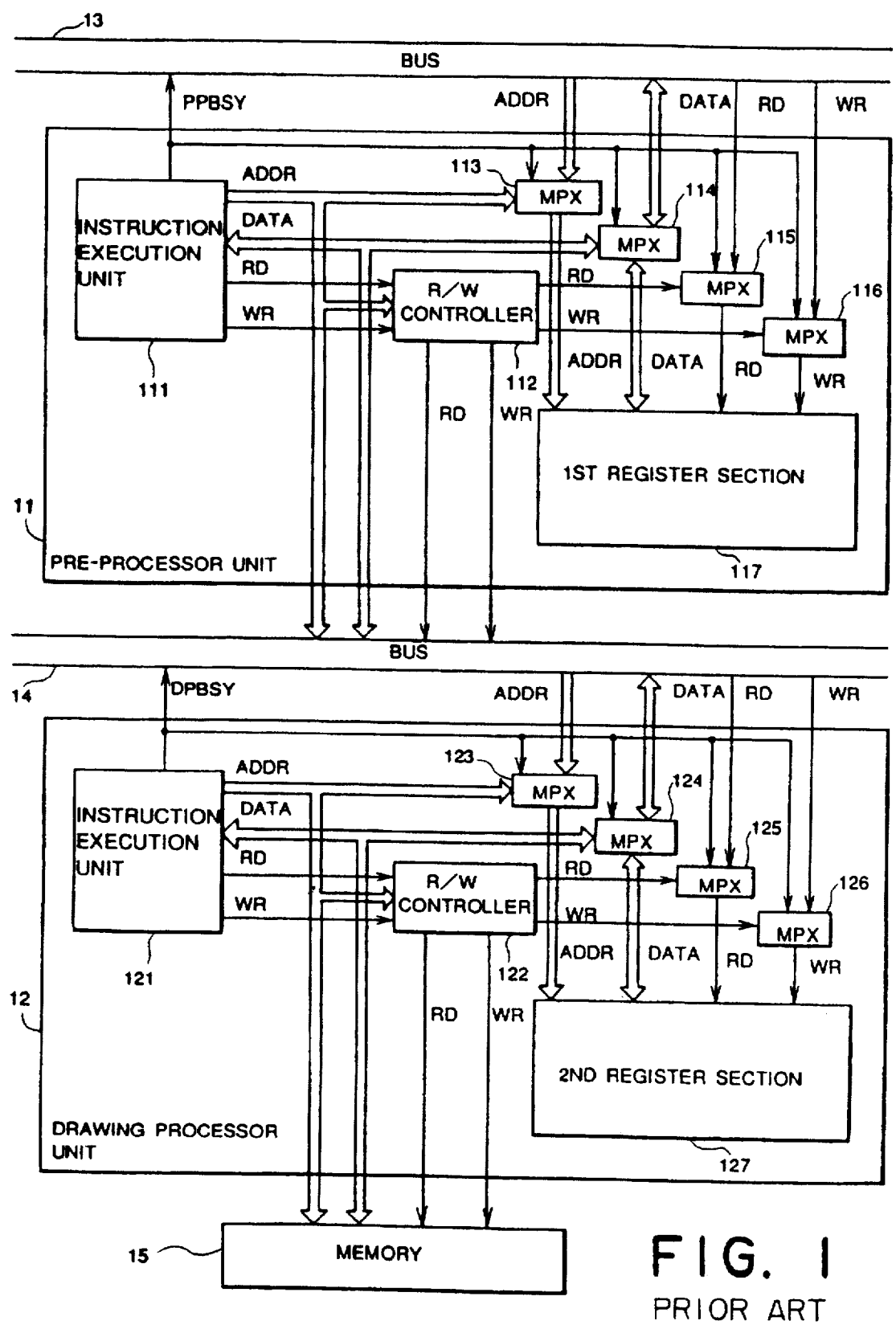
FIG. 1 is a block diagram of a conventional information processing system.

Referring to FIG. 1, a conventional information processing system is used to process drawing figures and may be called a drawing or a delineating processor system. The illustrated drawing processor system comprises a pre-processor unit 11 and a drawing processor unit 12 both of which are enabled by an external host central processing unit (CPU) (not shown) connected through first and second buses 13 and 14. The pre-processor unit 11 is connected to both the first and the second buses 13 and 14 while the drawing processor unit 12 is connected to the second bus 14.

The pre-processor unit 11 comprises an instruction execution unit 111, a read-write (R/W) controller 112, first through fourth multiplexers (MPX) 113, 114, 115, and 116, and a first register section 117.

The illustrated drawing processor unit 12 also comprises an instruction execution unit 121, a read-write controller 122, first through fourth multiplexers 123, 124, 125, and 126 and a second register section 127, like the pre-processor unit 12.

With this structure, the instruction execution unit 111 of the pre-processor unit 11 issues a pre-processor busy signal (PPBSY) of a logic "1" level onto the first bus 13 when the pre-processor unit 11 is put into a busy state. Likewise, the instruction execution unit 121 of the drawing processor unit 12 also issues a drawing processor busy signal (DPBSY) of the logic "1" level onto the second bus 14 when put into a busy state, as will be mentioned later.

The external host central processing unit monitors the pre-processor busy signal PPBSY to detect whether or not the pre-processor unit 11 is put into the busy state. During the busy state of the pre-processor unit 11, the external host central processing unit is kept into a waiting state. Once the busy state is released in the instruction execution unit 111, the external host central processing unit transfers, to the pre-processor unit 11, predetermined parameters, such as coordinates and attributes of drawing figures, which define the drawing figures. The parameters are given to the pre-processor unit 11 to be sent to the first register section 117 as parameter codes.

Herein, the first register section 117 comprises a parameter register portion (not shown) loaded with the above-mentioned parameters as parameter codes, a command register portion (not shown) loaded with the parameters as command codes, and a work register portion (also not shown).

The parameter codes are at first transferred from the external host central processing unit to be stored in the parameter register portions through the second multiplexer 114. Thereafter, the command codes are transferred from the external host central processing unit to be stored in the command register portion of the first register section 117 in a manner similar to that of the parameter codes. Under the circumstances, the instruction execution unit 111 of the pre-processor unit 11 is put into an enabled state by the external host central processing unit to start processing.

Specifically, the instruction execution unit 111 calculates, as calculated parameters, parameters which are necessary for the drawing processor unit 12 and which may be, for example, addresses of an image memory used in drawing a picture. The calculated parameters are stored in the work register portion of the first register section 117.

After completion of calculating the parameters, the instruction execution unit 111 monitors the drawing processor busy signal (DPBSY) to detect whether or not the execution processor unit 121 of the drawing processor unit 12 is put in the busy state. When the drawing processor busy signal takes the logic "1" level, the instruction processor unit 111 is kept in a waiting state.

If the waiting state is released in the execution processor unit 121 of the drawing processor unit 12, the instruction processor unit 111 successively transfers the calculated parameters to the second register section 127. On transferring the calculated parameters from the first register section 117 to the second register section 127, the read/write controller 112 of the pre-processor unit 11 monitors the addresses of the calculated parameters to detect that the calculated parameters to the drawing processor unit 12 are transferred from the first register section 117. Such transfer of the calculated parameters is carried out through the second multiplexer 114, the second bus 14, and the second multiplexer 124 to the second register section 127.

Inasmuch as the second register section 127 of the drawing processor unit 12 comprises a parameter register portion, a command register portion, and a work register portion, like the first register section 117, the calculated parameters are successively stored in the corresponding work register portion.

Thus, the pre-processor unit 11 completes a processing operation concerned with a single one of the drawing commands issued from the external host central processing unit. Thereafter, the pre-processor unit 11 writes the command code in question into the command register portion of the second register section 127 to put the instruction execution unit 121 of the drawing processor unit 12 into the enabled state.

Subsequently, the drawing processor unit 12 executes a drawing operation by the use of a memory 15. In this event, the read-write controller 122 of the drawing processor unit 12 monitors each address to determine whether the instruction execution unit 121 accesses the second register section 127 or the memory 15.

With this structure, the pre-processor unit 11 can execute parameter calculation in parallel with the processing operation of the drawing processor unit 12. Herein, it is to be noted that calculated parameters or results are once stored in the work register portion of the first register section 117 and are thereafter transferred to the drawing processor unit 12 after a processing operation is finished in the drawing processor unit 12.

However, the above-mentioned information processing system has disadvantages as pointed out in the preamble of the instant specification.

Figure 2:
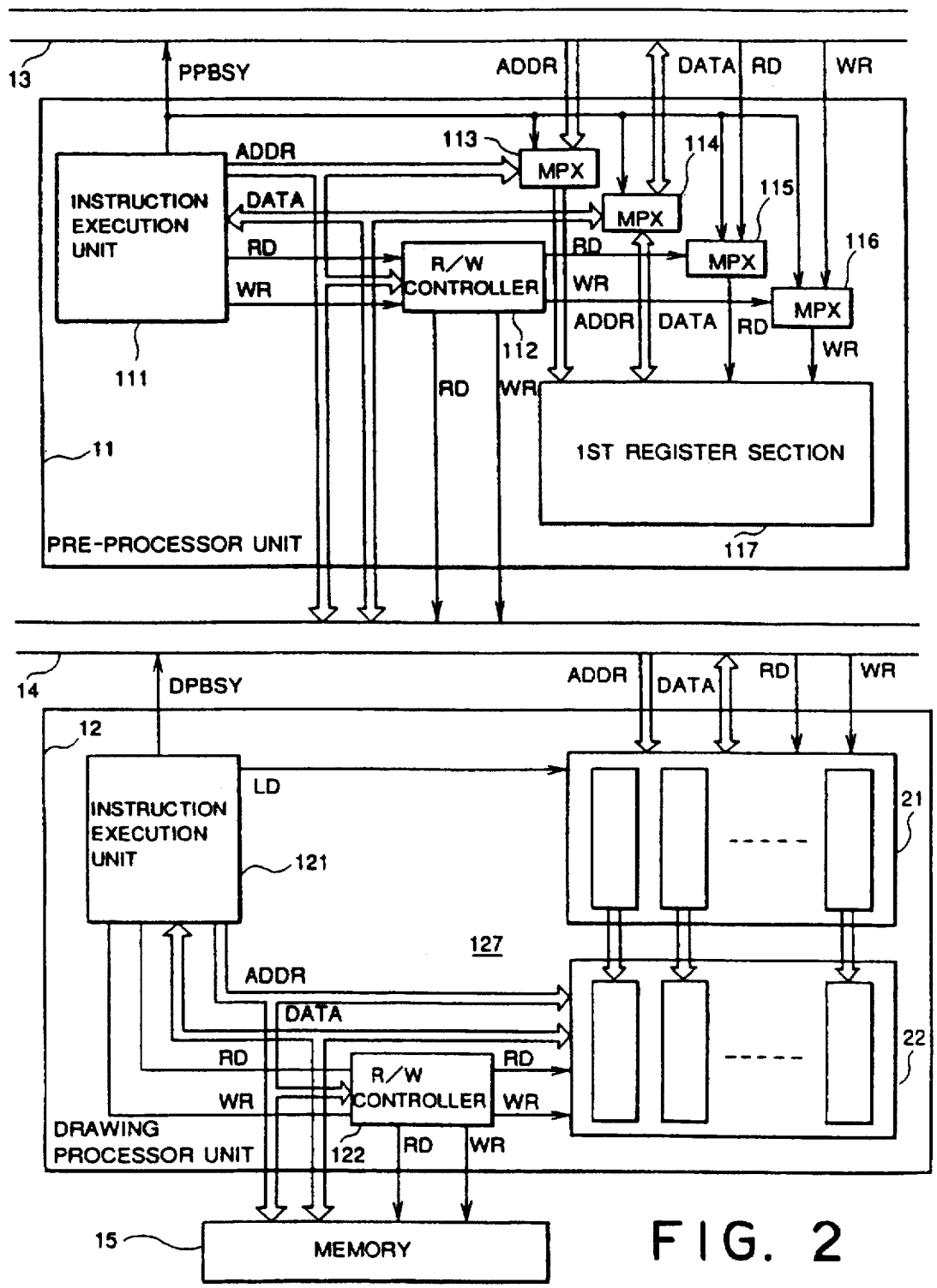
FIG. 2 is a block diagram of an information processing system according to this invention.

Referring to FIG. 2, an information processing system according to a first embodiment of this invention comprises similar parts designated by like reference numerals and symbols. Briefly, it is to be noted that the second register section 127 of the illustrated drawing processor unit 12 comprises a first-stage register section 21 and a second-stage register section 22 connected to the first-stage register section 21.

More specifically, the pre-processor unit 11 and the drawing processor unit 12 are connected to the first bus 13 and the second bus 14, respectively, and are controlled by the external host central processing unit (not shown). As shown in FIG. 2, the pre-processor unit 11 comprises the instruction execution unit 111, the read/write controller 112, the first through the fourth multiplexers 113 to 116, and the first register section 117, like in FIG. 1. Similarly, the drawing processor unit 12 also comprises the instruction execution unit 121 and the read/write controller 122 together with the first-stage and the second-stage register sections 21 and 22 and cooperates with the memory 15 used for drawing a picture or figure.

For a better understand of the illustrated information processing system in detail, the pre-processor unit 11 and the drawing processor unit 12 will be described later in detail. In the pre-processor unit 11, the read/write controller 112 is given a read signal (RD), a write signal (WR), and an address signal (ADDR) from the instruction execution unit 111.

The read/write controller 112 determines whether the read signal (RD) and the write signal (WR) are sent to the third and the fourth multiplexers (MPX) 115 and 116 or the second bus 14. In addition, the first multiplexer (MPX) 113 is supplied with address signals (ADDR) from the external host central processing unit and the instruction execution unit 111 to selectively send both the address signals (ADDR) to the first register section 117 under control of the instruction execution unit 111. On the other hand, the second multiplexer (MPX) 114 multiplexes, under control of the instruction execution unit 111, data signals, such as command codes, parameter codes, sent from the instruction execution unit 111 and the first bus 13. Likewise, the third and the fourth multiplexers 115 and 116 multiplexes the read signals (RD) and the write signals (WR) sent from the read/write controller 112 and the first bus 13.

The first register section 117 comprises the parameter register portion, the command register portion, and the work register portion, as mentioned in conjunction with FIG. 1.

In the drawing processor unit 12, the read/write controller 122' controls whether the instruction execution unit 121 of the drawing processor unit 12 accesses the second-stage register section 22 or the memory 15. In this event, the read/write controller 122' supplies address signals (ADDR), a read signal (RD), and a write signal (WR) from the instruction execution unit 121 and decides whether the read signal (RD) and the write signal (WR) are to be sent to the second-stage register section 22 or the memory 15 by monitoring the address signals (ADDR).

Figure 3:
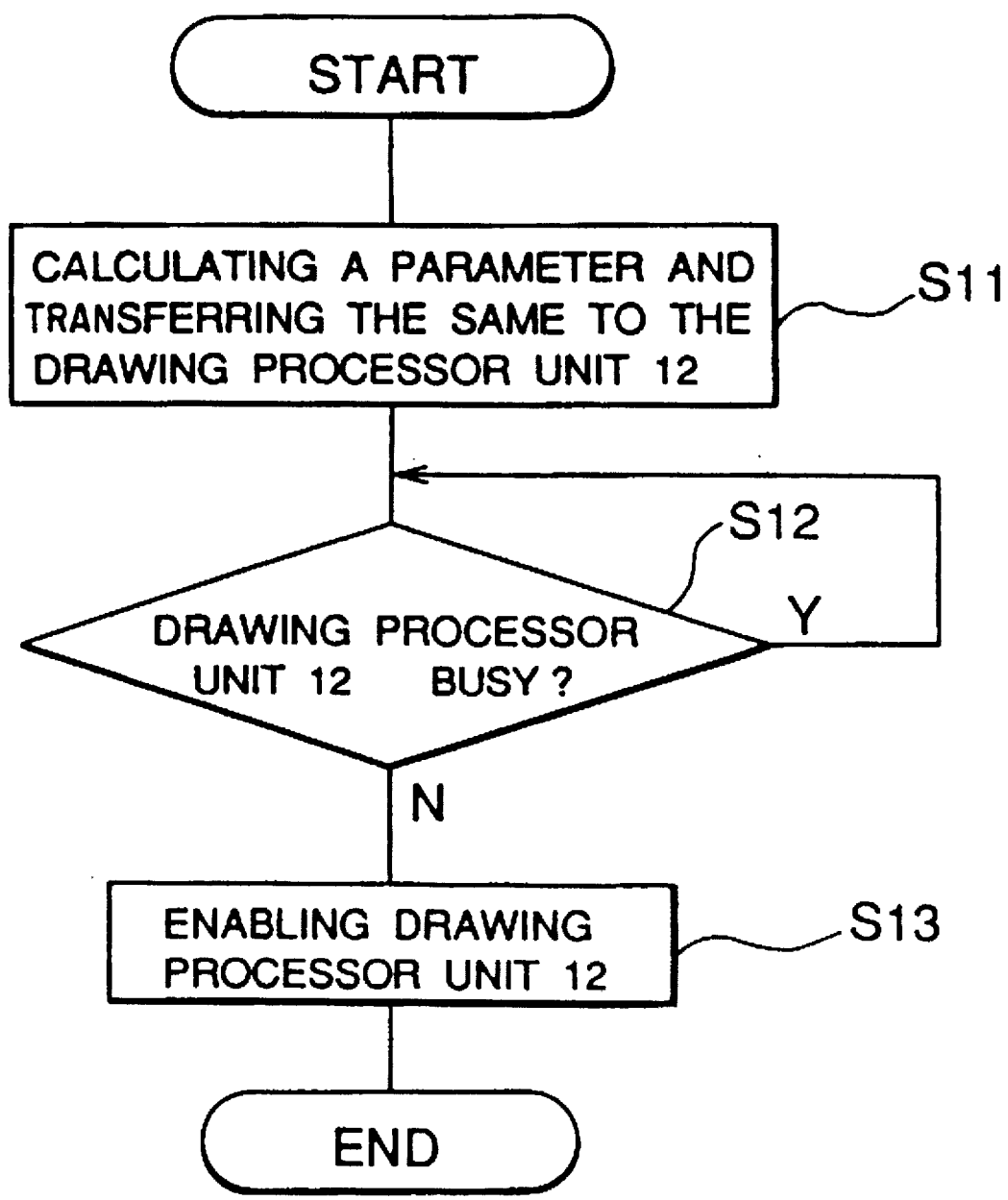
FIG. 3 is a flow chart for use in describing operation of a pre-processor unit illustrated in FIG. 2.

Referring to FIG. 3 together with FIG. 2, description will be made about a processing operation which is carried out in the pre-processor unit 11 illustrated in FIG. 2, although the processing operation is similar to that illustrated with reference to FIG. 1. At first, the external host central processing unit monitors the pre-processor busy signal (PPBSY) to be put into the waiting state, if the pre-processor busy signal (PPBSY) takes the logic "1" level and specifies the busy state of the pre-processor unit 11.

When the pre-processor busy signal (PPBSY) takes the logic "0" level to specify an inactive state of the pre-processor unit 11 and, as a result, the busy state is released in the pre-processor unit 11, parameters which define a picture or a figure to be drawn are transferred from the external host central processing unit into the parameter register portion of the first register section 117. While the pre-processor busy signal (PPBSY) takes the logic "0" level, the first through the fourth multiplexers 113 to 116 select the address signal (ADDR), a data signal (DATA), such as parameter signals, the read signal (RD), and the write signal (WR) sent from the external host central processing unit through the first bus 13.

When the parameter signals are set into the first register section 117, the external host central processing unit writes a single one of the command codes into the command register portion. Consequently, the instruction execution processor 111 of the pre-processor unit 11 is enabled to start a processing operation in accordance with the command code under consideration.

After the pre-processor 11 is enabled, the pre-processor busy signal (PPBSY) is turned into the logic "1" level. In this situation, the first through the fourth multiplexers 113 to 116 select the address signal (ADDR), the data signal (DATA), the read signal (RD), and the write signal (WR) which are sent from the instruction execution unit 111 and which are stored into the first register section 117. Under the circumstances, the pre-processor 11 calculates, as calculated results, various kinds of parameters necessary for the drawing processor unit 12 by the use of the first register section 117.

Each time when each of the calculated results is calculated by the pre-processor unit 11, the pre-processor unit 11 transfers each calculated result to a preselected one of registers in the first-stage register section 21 of the drawing processing unit 12, as shown at a first step S11 in FIG. 3.

When pre-processing is finished, the pre-processor unit 11 monitors the drawing processor busy signal (DPBSY) to be put into a waiting state when the drawing processor unit 12 is put into the busy state, as shown at a second step S12 in FIG. 3.

If the busy state is released in the drawing processor unit 12, the drawing processor unit 12 is enabled to write the command code in question into the command register of the first-stage register section 21, as shown at a third step S13 in FIG. 3. Thereafter, the processing operation is finished in the pre-processor unit 11.

Turning back to FIG. 2, the instruction execution unit 121 of the drawing processor unit 12 which is enabled by the pre-processor unit 11 supplies a load signal LD to the first-stage register section 21. Responsive to the load signal LD, the first-stage register section 21 transfers contents thereof to the second-stage register section 22. The contents of the registers in the first-stage register section 21 are transferred to the corresponding ones of the registers in the second-stage register section 22. Such transfer of the contents from the first-stage register section 21 to the second-stage register section 22 is simultaneously carried out in response to the load signal LD.

Thereafter, the instruction execution unit 121 executes the drawing processing by the use of the contents transferred to the second-stage register section 22 and memorizes results of the drawing processing in the memory 15.

Figure 4:
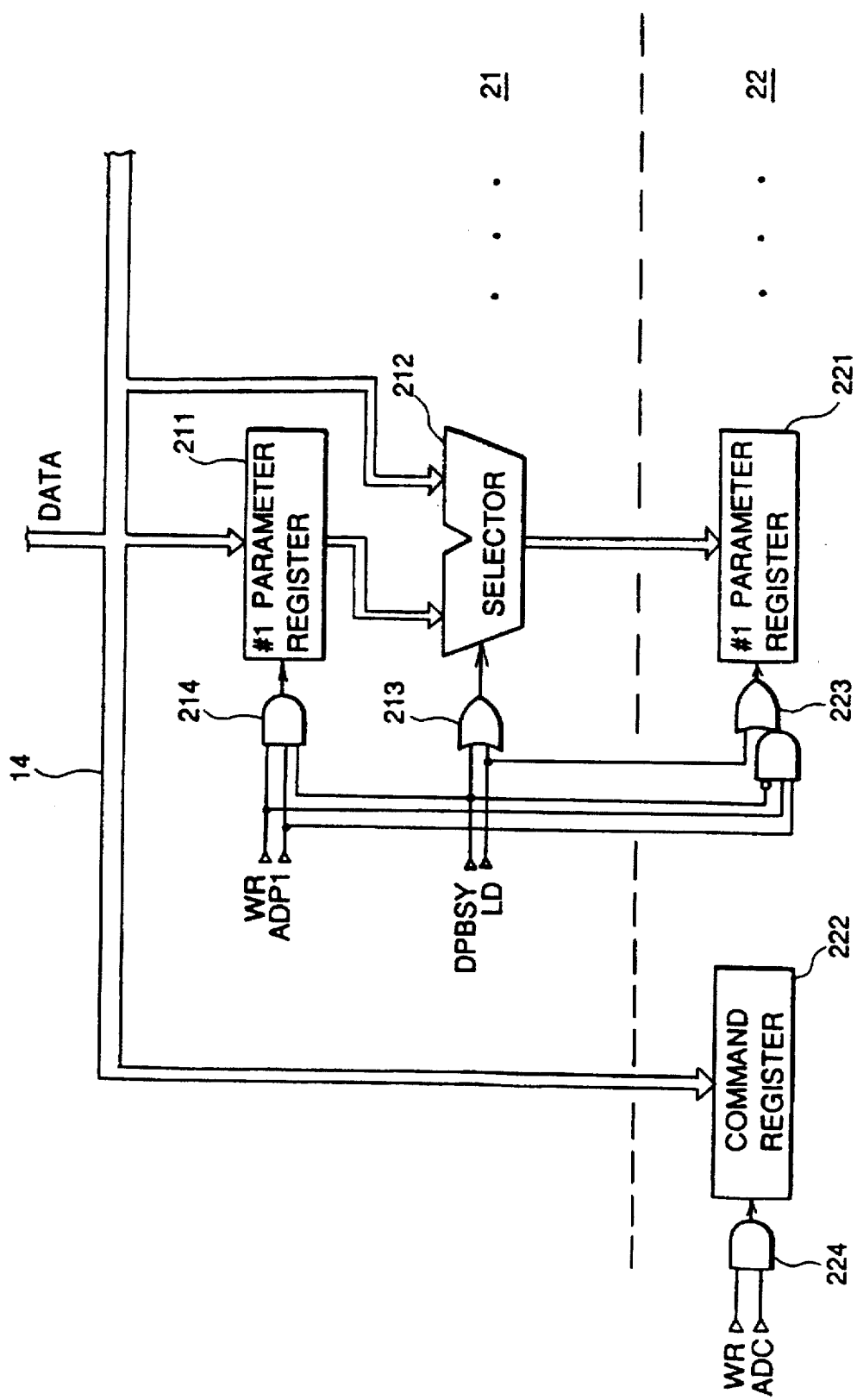
FIG. 4 is a block diagram of a drawing processor unit according to a first embodiment of this invention.

Referring to FIG. 4, the transfer operation of the contents from the first-stage register section 21 to the second-stage register section 22 will be described more in detail so as to facilitate an understanding of this invention. Although each of the first-stage and the second-stage register sections 21 and 22 practically comprises a plurality of parameter registers, a first or #1 parameter register 211 and a corresponding first or #1 parameter register 221 alone are illustrated in the first-stage and the second-stage register sections 21 and 22, respectively. In the illustrated example, a plurality of command registers are included only in the second-stage register section 22 and a single one of the command registers is shown at 222 in FIG. 4.

In addition, the first-stage register section 21 further comprises a selector 212 which is connected to both the #1 parameter register 211 and the second bus 14 and which is controlled by an OR gate 213 in a manner to be described later. Likewise, the #1 parameter registers 211 and 221 in the first-stage and the second-stage register sections 21 and 22 are controlled by gate circuits 214 and 223, respectively. The gate circuit 214 which is composed of an AND gate is supplied with an address reception signal ADP1 representative of reception of an initial one of the parameter data signals from the pre-processor unit 11 together with the write signal (WR). The address reception signal ADP1 is produced by decoding a specific one of the address signals (ADDR) sent from the pre-processor unit 11 by the use of a decoder (not shown) which is connected to the second bus 14. In the illustrated example, both the write signal (WR) and the address reception signal ADP1 are also delivered to the gate circuit 223 of the second-stage register section 22.

Moreover, the illustrated command register 222 of the second-stage register section 22 is controlled by an AND gate 224 which is supplied with the write signal (WR) and a command register selection signal (ADC) which specifies the command register 222 and which is produced by decoding the address signal (ADDR) in a decoder (not shown).

Herein, it is to be noted that the pre-processor unit 11 transfers the parameter data signals (DATA) to the drawing processor unit 12 even when the drawing processor unit 12 issues the drawing processor busy signal (DPBSY) of the logic "1" level.

Taking this into consideration, it is at first assumed that the drawing processor unit 12 is put into a ready state with the drawing processor busy signal (DPBSY) kept at the logic "0" level. When the drawing processor busy signal (DPBSY) is kept at the logic "0" level, the selector 212 in the first-stage register section 21 selects the second bus 14. Let the initial parameter data signal (DATA) be given from the pre-processor unit 11 through the second bus 14 to the drawing processor unit 12 along with the write signal (WR) and the address signal (ADDR) assigned to the initial parameter address.

Under the circumstances, the gate circuit 214 is closed while the gate circuit 223 is opened, because each of the write signal (WR) and the address reception signal (ADP1) takes the logic "1" level. As a result, the initial parameter data signal (DATA) is transferred from the pre-processor unit 11 to the drawing processor unit 12. Specifically, the initial parameter data signal is transferred from the pre-processor unit 11 through the selector 212 to the #1 parameter register 221 of the second-stage register section 22 and stored in the #1 parameter register 221. Thus, the initial parameter data signal (DATA) is not stored in the #1 parameter register 211 of the first-stage register section 21 during the ready state of the drawing processor unit 12. Similar operation is also carried out in the remaining parameter registers.

The command data signal (DATA) is also delivered together with the address signal (ADDR) and the write signal (WR) from the pre-processor unit 11 to the command register 222 included in the second-stage register section 22 and written into the command register 222 while the drawing processor busy signal (DPBSY) is kept at the logic "0" level. This is because each of the command register selection signal (ADC) and the write signal (WR) takes the logic "1" level and the AND gate 224 is opened.

When the command data signal (DATA) is written into the command register 222, the drawing processor unit 12 is put into the enabled state to execute the drawing processing on the basis of the command data signal and the parameter data signal or signals stored in the second-stage register section 22. During execution of the drawing processing, the instruction execution unit 121 turns the drawing processor busy signal (DPBSY) into the logic "1" level.

Subsequently, let the pre-processor unit 11 generate a next following parameter data signal in accordance with a next following request sent from the external host central processing unit. Inasmuch as the drawing processor busy signal (DPBSY) is kept at the logic "1" level, the next following parameter data signal is stored in the parameter register, such as 211, of the first-stage register section 21. Thus, the remaining parameter data signals are successively transferred to the parameter registers of the first-stage register section 21. When all of the parameter data signals are completely transferred to the first-stage register section 21, the pre-processor unit 11 monitors the drawing processor busy signal (DPBSY) to be put into the waiting state when the drawing processor unit 12 is in the busy state.

On the other hand, when the drawing processor unit 12 completes current processing, the instruction execution unit 121 (FIG. 2) of the drawing processor unit 12 turns the drawing processor busy signal (DPBSY) into the logic "0" level and simultaneously produces the load signal LD which is sent to the OR gate 213 and the gate circuit 223 illustrated in FIG. 4.

Responsive to the load signal LD, the selector 212 (FIG. 4) selects the parameter register, such as 211. Concurrently, the parameter register 221 of the second-stage register section 22 is enabled by the load signal LD to store a content or the parameter data signal of the parameter register 211 in the first-stage register section 21.

When the drawing processor busy signal (DPBSY) becomes the logic "0" level, the pre-processor unit 11 transfers the command data signal to the drawing processor unit 12 to write the command data signal into the command register 222 of the second-stage register section 22. Responsive to the command data signal, the drawing processor unit 12 starts a subsequent processing operation in accordance with the command data signal.

Figure 5:
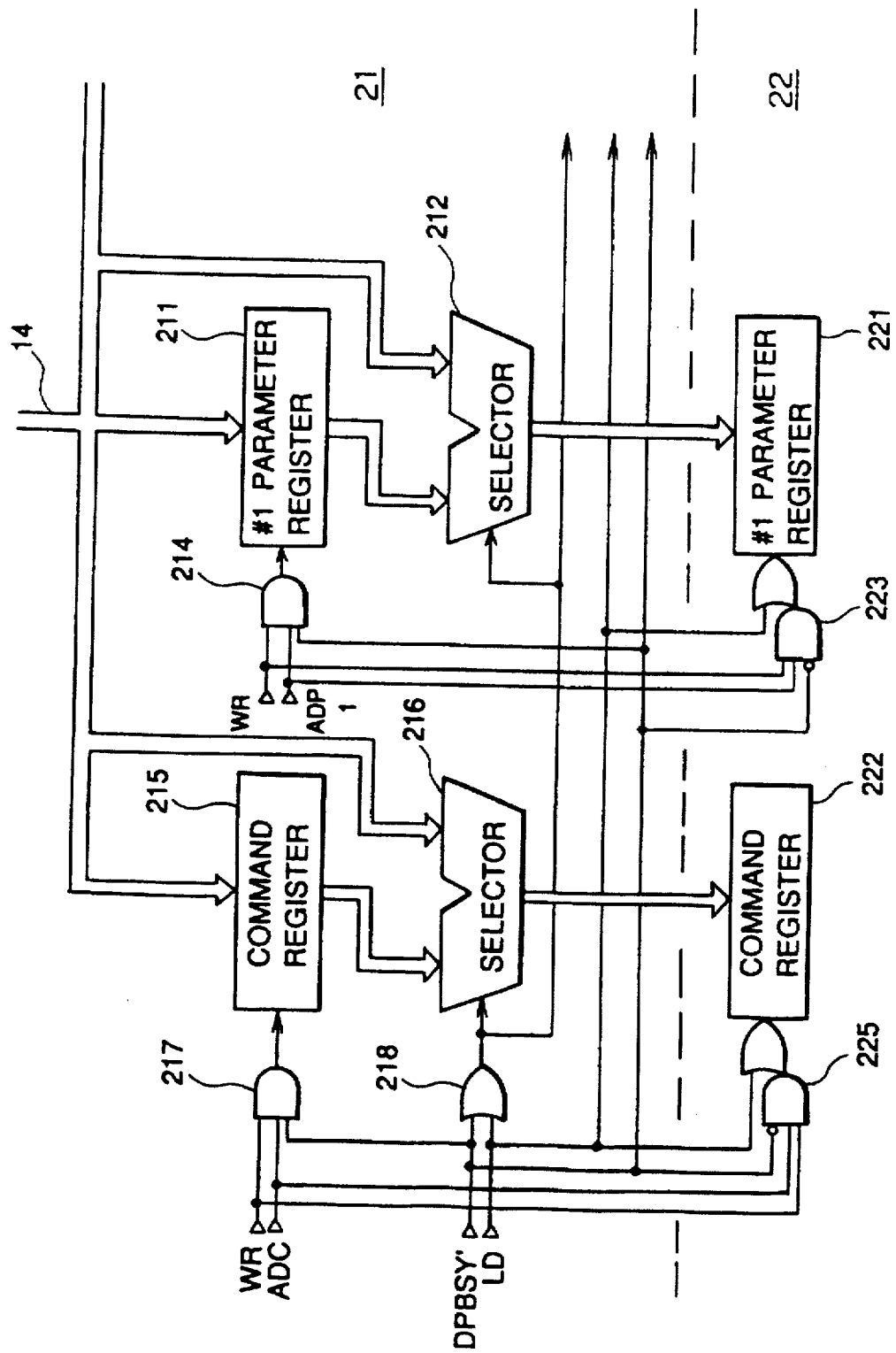
FIG. 5 is a block diagram of a drawing processor unit according to a second embodiment of this invention.

Referring to FIG. 5, an information processing system according to a second embodiment of this invention is similar in structure and operation to that illustrated in FIGS. 2 and 4 except for a structure of the first-stage register section 21 and the second-stage register section 22. In the illustrated example, the first-stage register section 21 also comprises a command register 215, a selector 216, an AND gate 217 connected to the command register 215, and an OR gate 218 connected to the selector 216.

In FIG. 5, it is to be noted that the parameter and the command registers, such as 211, 215, in the first-stage register section 21 are equal in number to those in the second-stage register section 22 and are in one-to-one correspondence to the latter, as readily understood from FIG. 5. In this connection, the instruction execution unit 121 of the drawing processor unit 12 monitors both the first-stage register section 21 and the second-stage register section 22 to produce the drawing processor busy signal (DPBSY) of the logic "1" level when both the first-stage and the second-stage register sections 21 and 22 are in busy states, namely, are loaded with unprocessed or pending data signals. In addition, the instruction execution unit 121 further produces an additional drawing processor busy signal (DPBSY') of the logic "1" level when the drawing processor unit 12 executes a drawing processing operation on the basis of data signals stored in the second-stage register section 22, although not shown in FIG. 2. The additional drawing processor busy signal (DPBSY') is also sent to the pre-processor unit 11 like the drawing processor busy signal (DPBSY).

Accordingly, the pre-processor unit 11 can transfer a following parameter data signal and a following command data signal to the drawing processor unit 12 even when the drawing processor unit 12 is executing the drawing processing operation on the basis of contents stored in the second-stage register section 22, if the first-stage register section 21 is not busy. After completion of the following parameter data signal and the following command data signal, the drawing processor busy signal (DPBSY) is turned into the logic "1" level and is delivered to the pre-processor unit 11. Responsive to the drawing processor busy signal (DPBSY), the pre-processor unit 11 is put into the waiting state of waiting a subsequent data signal, such as a parameter data signal and a command data signal.

When the drawing processing operation is finished as regards a current parameter data signal and a current command data signal, the load signal LD is delivered from the instruction execution unit 121 to the register section 127.

In FIG. 5, the load signal LD is supplied to the selectors 216 and 212 of the first-stage register section 21 through the OR gate 218 and is also supplied to the command register 222 and the parameter registers, such as 221, through the gate circuits 223 and 225. As a result, contents of the parameter register, such as 211, and the command register 215 are transferred to the parameter and the command registers of the second-stage register section 22. After transfer operation is completed, a following drawing operation is started in the drawing processor unit 12. In this situation, the drawing processor busy signal (DPBSY) is changed to the logic "0" level to allow the following parameter and command data signals to be transferred from the pre-processor 11. On the other hand, the additional drawing processor busy signal (DPBSY') is kept at the logic "1" level.

In any event, the drawing processor unit 12 according to the first and the second embodiments of this invention can receive the parameter data signal or signals from the pre-processor 11 even during the drawing processing operation.

Figure 6:
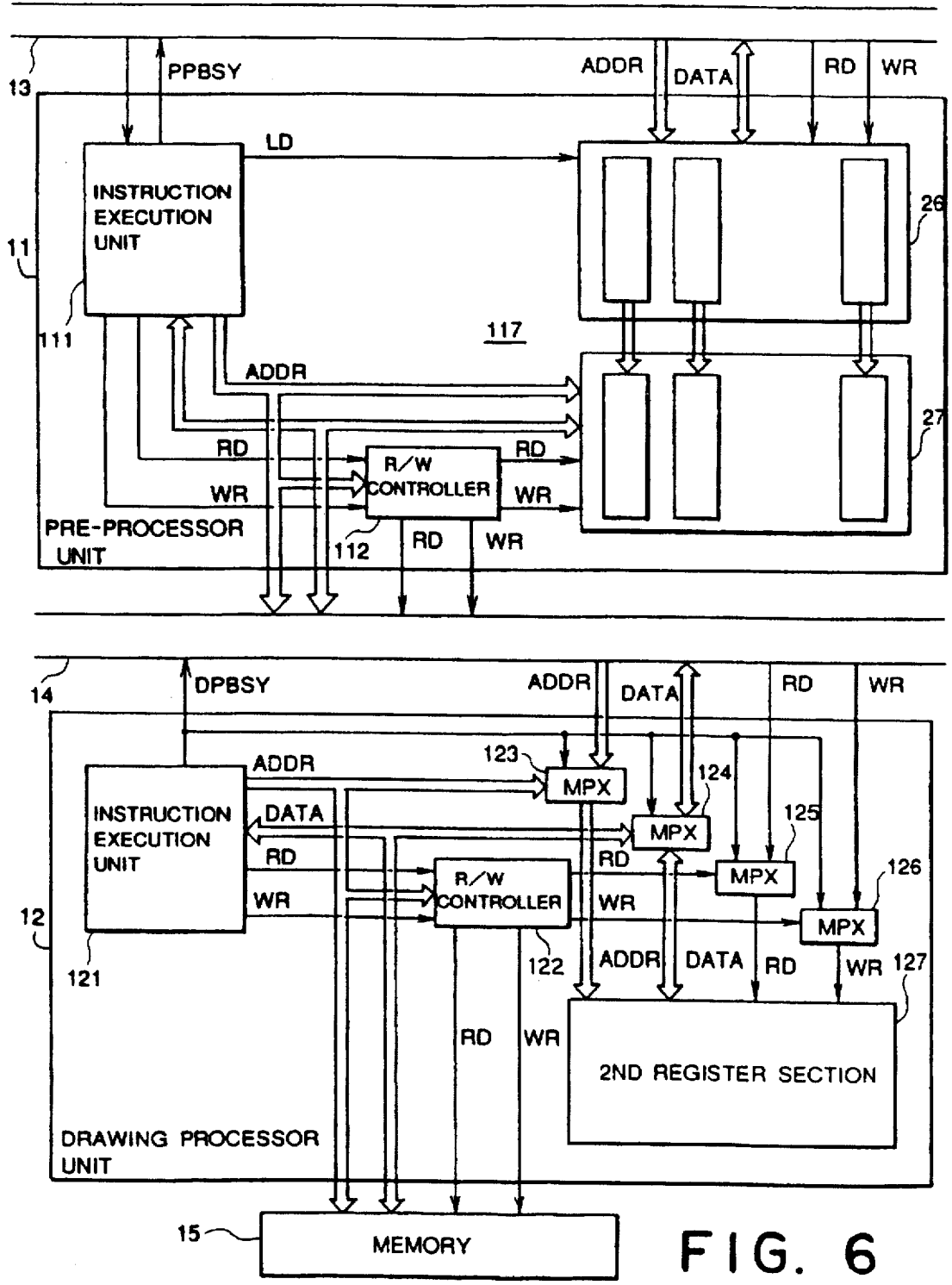
FIG. 6 is a block diagram of an information processing system according to another embodiment of this invention.

Referring to FIG. 6, an information processing system according to a third embodiment of this invention comprises similar parts designated by like reference numerals and symbols. Specifically, the illustrated pre-processor unit 11 is similar in structure to the drawing processor unit 12 shown in FIG. 2 while the illustrated drawing processor unit 12 is similar in structure to that shown in FIG. 1. In this connection, the pre-processor unit 11 in FIG. 6 comprises a first register section 117 which is composed of a first-stage register section 26 and a second-stage register section 27 controlled in a manner similar to that illustrated in connection with FIG. 5. From this fact, it is readily understood that the illustrated first-stage register section 26 comprises a plurality of parameter registers, a plurality of selectors, and gate circuits connected to the parameter registers and the selectors, like in FIG. 4, while the second-stage register section 27 comprises a command register and a gate circuit, like in FIG. 4.

With this structure, each parameter data signal is directly stored in the parameter register of the second-stage register section 27 in the absence of the pre-processor busy signal (PPBSY) through the selector of the first-stage register section 26, as mentioned in conjunction with FIG. 4. On the other hand, each parameter data signal is stored in the parameter register of the first-stage register section 26 in the presence of the pre-processor busy signal (PPBSY) and is thereafter transferred to the second-stage register section 27 in response to the load signal LD given from the instruction execution unit 111 of the pre-processor unit 11 in a like manner as mentioned in FIG. 4.

Like in FIG. 4, each command data signal is directly sent through the first-stage register section 26 to the second-stage register section 27 and stored in the command register of the second-stage register section 27.

Alternatively, the first-stage register section 26 and the second-stage register section 27 may be similar to the first-stage register section 21 and the second-stage register section 22 illustrated in FIG. 5. In this case, the instruction execution unit 111 of the pre-processor unit 11 supplies the first bus 13 with an additional pre-processor busy signal (PPBSY') in addition to the pre-processor busy signal (PPBSY) in a manner similar to that described in conjunction with FIG. 5.

At any rate, the registers, such as the command and the parameters registers, in the second-stage register section 27 are in one-to-one correspondence with those in the first-stage register section 26.

As readily understood from the above description, it is possible to transfer parameter data signals from the external host central processor unit to the pre-processor while the pre-processor is carrying out a processing operation concerned with a previous command data signal.

All of the above-mentioned embodiments can shorten a quiescent time or a waiting time of either the pre-processor unit 11 or the drawing processor unit 12 and enable a reduction of a total execution time necessary for the drawing processing operation.

In order to clarify an advantage or a merit of this invention, comparison will be made between the conventional information processing system illustrated in FIG. 1 and the information processing system illustrated in FIGS. 2 and 6.

For brevity of description, let one hundred straight lines of the same length be drawn on an X-Y coordinate system with attributes changed at every line. It is to be noted that each line can be defined by two coordinate positions which are given, for example, by X1, Y1, X2, and Y2. In other words, the two coordinate positions may be specified by four position parameter data signals. Herein, it is assumed that a transfer time for transferring a single parameter from the external host central processing unit is equal to 200 nanoseconds and that seven parameter data signals are transferred from the external host central processing unit to define each line. The seven parameter data signals may be composed of four position parameter data signals, such as X1, Y1, X2, and Y2, a color parameter data signal representative of a color of each line, a species parameter data signal representative of a species of logical calculation used in a drawing operation, and a length parameter data signal representative of a length of a line species on the memory. Under the circumstances, the transfer time of the seven parameter data signals become equal to 1.4 microseconds because:

200 (nanoseconds)×7=1.4 (microseconds).

In addition, when a transfer time of each command data signal is assumed to be also equal to 200 nanoseconds, the external central processing unit needs a processing time of 1.6 microseconds.

As regards the pre-processor unit 11, it is assumed that each command data signal for drawing a single straight line is processed by a pre-processing operation composed of forty-six (46) steps which include fifteen (15) steps for parameter transfer to the drawing processor unit 12 and a single step for command transfer to the drawing processor 12. In addition, when an operation frequency of 10 (GHz) is used, the pre-processor unit 11 can process a single step in a processing time of 100 nanoseconds. Therefore, a time for processing the forty-six steps is given by:

$$100 \text{ (nanoseconds)} \times 46 \text{ (steps)} = 4.6 \text{ (microseconds)}.$$

Moreover, a transfer time of the parameter data signals to the drawing processor unit 12 becomes equal to:

$$100 \text{ (nanoseconds)} \times 15 \text{ (steps)} = 1.5 \text{ (microseconds)}.$$

As regards the drawing processor unit 12, a drawing processing operation is assumed to take 6.2 microseconds.

On the above-mentioned assumptions or conditions, consideration will at first be directed to operation of the conventional information processing system.

Figure 7:
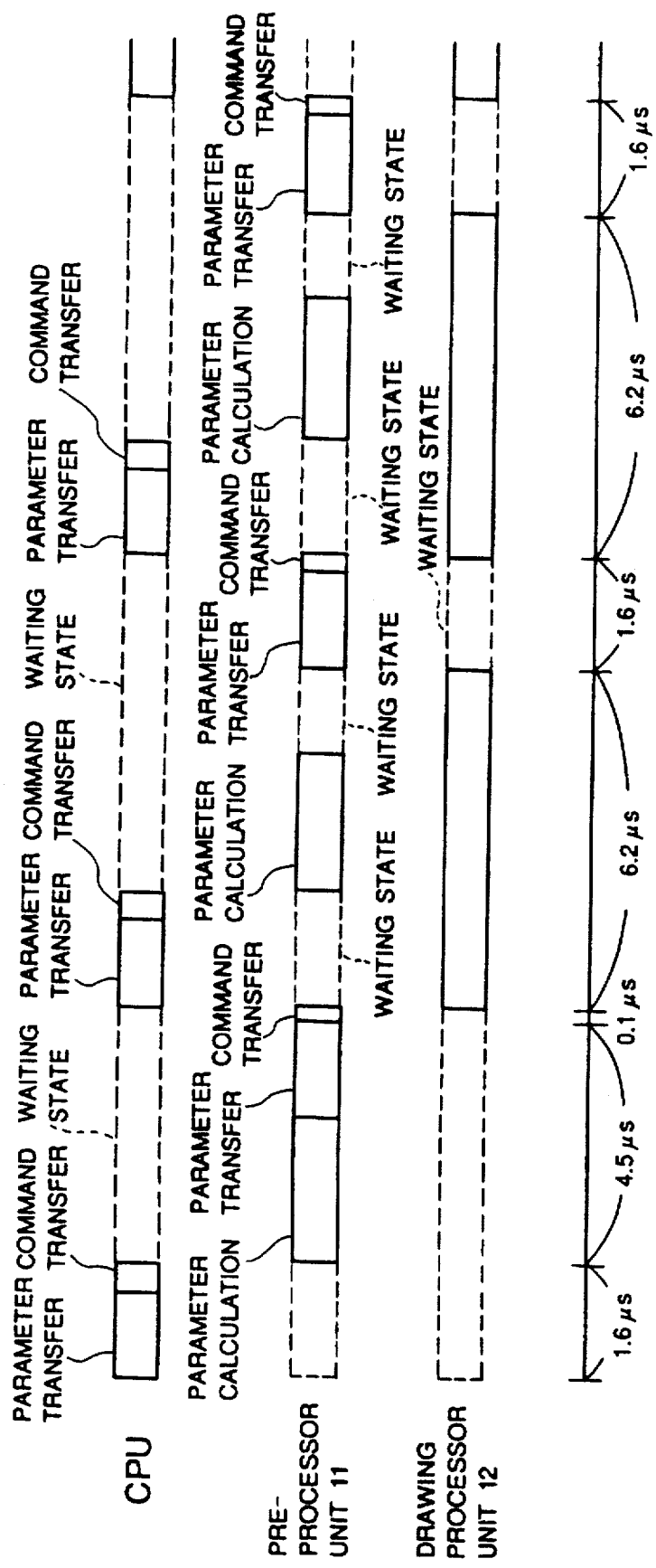
FIG. 7 is a time chart for use in describing operation of the conventional information processing system illustrated in FIG. 1.

Referring to FIG. 7, illustration is made about operation of the conventional information processing system (shown in FIG. 1) which comprises the external host central processing unit (CPU), the pre-processor unit 11, and the drawing processor unit 12. As shown in FIG. 7, the CPU takes 1.6 microseconds to transfer both each parameter and command to the pre-processor 11 while the pre-processor unit 11 takes 4.6 microseconds to process each command data signal. Such processing in the pre-processor unit 11 is composed of parameter calculation operation, parameter transfer operation, and command transfer operation, as shown in FIG. 7.

In FIG. 7, it should be noted that a waiting state or a waiting time becomes long in the drawing processor unit 12. This is because the waiting time of the drawing processor unit 12 is determined by a time for transferring each parameter data signal and each command data signal from the pre-processor unit 11 to the drawing processor unit 12. Inasmuch as a transfer time of each parameter data signal and a transfer time of each command data signal are equal to 1.5 microseconds and 0.1 microsecond in the illustrated example, the waiting time of the drawing processor unit 12 is given by:

$$1.5 + 0.1 = 1.6 \text{ (microseconds)}.$$

As understood from FIG. 7, a time for drawing a first one of the straight lines is given by:

$$1.6 + 4.6 + 6.2 = 12.4 \text{ (microseconds)}.$$

As to the remaining ninety-nine straight lines, a time for drawing each of the remaining straight line is given by a sum of the waiting time of 1.6 (microseconds) and the drawing processing time of 6.2 (microseconds) and is therefore equal to 7.8 (microseconds).

From the above, a drawing time for the one hundred straight lines can be given by:

$$12.4 + 7.8 \times 99 = 784.6 \text{ (microseconds)}.$$

Figure 8:
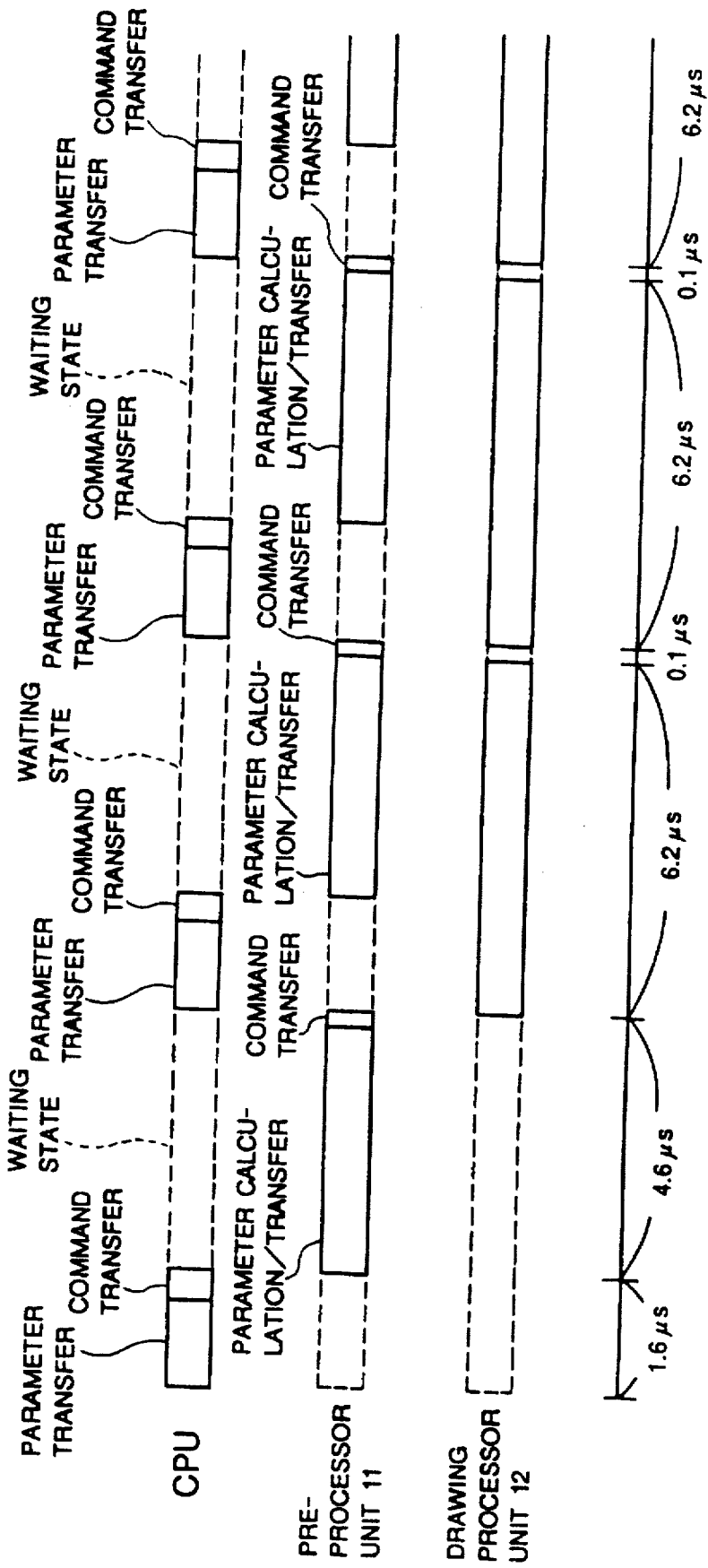
FIG. 8 is a time chart for use in describing operation of the information processing system illustrated in FIG. 2.

Referring to FIG. 8, illustration is made about operation of the information processing system which is illustrated in FIG. 2 and which is operated on the same operation conditions as the conventional information processing system. As shown in FIG. 8, the drawing processor unit 12 starts the operation in response to the command data signal and carries out the drawing processing operation during the processing time of 6.2 microseconds, like in FIG. 7. However, the pre-processor unit 11 transfers parameter data signals calculated therein to the drawing processor unit 12 during the processing time of the drawing processor unit 12. Therefore, the waiting time of the drawing processor unit 12 is determined only by the transfer time of each command data signal and is equal to 0.1 (microsecond). In other words, the waiting time of the drawing processor unit 12 in FIG. 8 is shortened from 1.6 microseconds to 0.1 microsecond. Therefore, a total processing time is reduced by:

$$(1.6 - 0.1) \times 99 = 148.5 \text{ (microseconds)}.$$

In other words, a practical total processing time is given by:

$$784.6 - 148.5 = 636.1 \text{ (microseconds)}$$

and is reduced to 81% of a conventional practical total processing time.

The above description has been made on the assumption that the processing time of the drawing processor unit 12 is longer than that of the pre-processor unit 11.

However, when the processing time of the drawing processor unit 12 is shorter than that of the pre-processor unit 11, the practical total processing time of the drawing processor unit 12 can not be shortened in the information processing system illustrated in FIG. 2. Instead, the information processing system illustrated in FIG. 6 is effective to substantially shorten the practical total processing time in the drawing processor unit 12.

More specifically, let the processing time of the drawing processor unit 12 be equal to 3.0 (microseconds) with the other conditions mentioned in FIGS. 7 and 8 which are kept unchanged.

Figure 9:
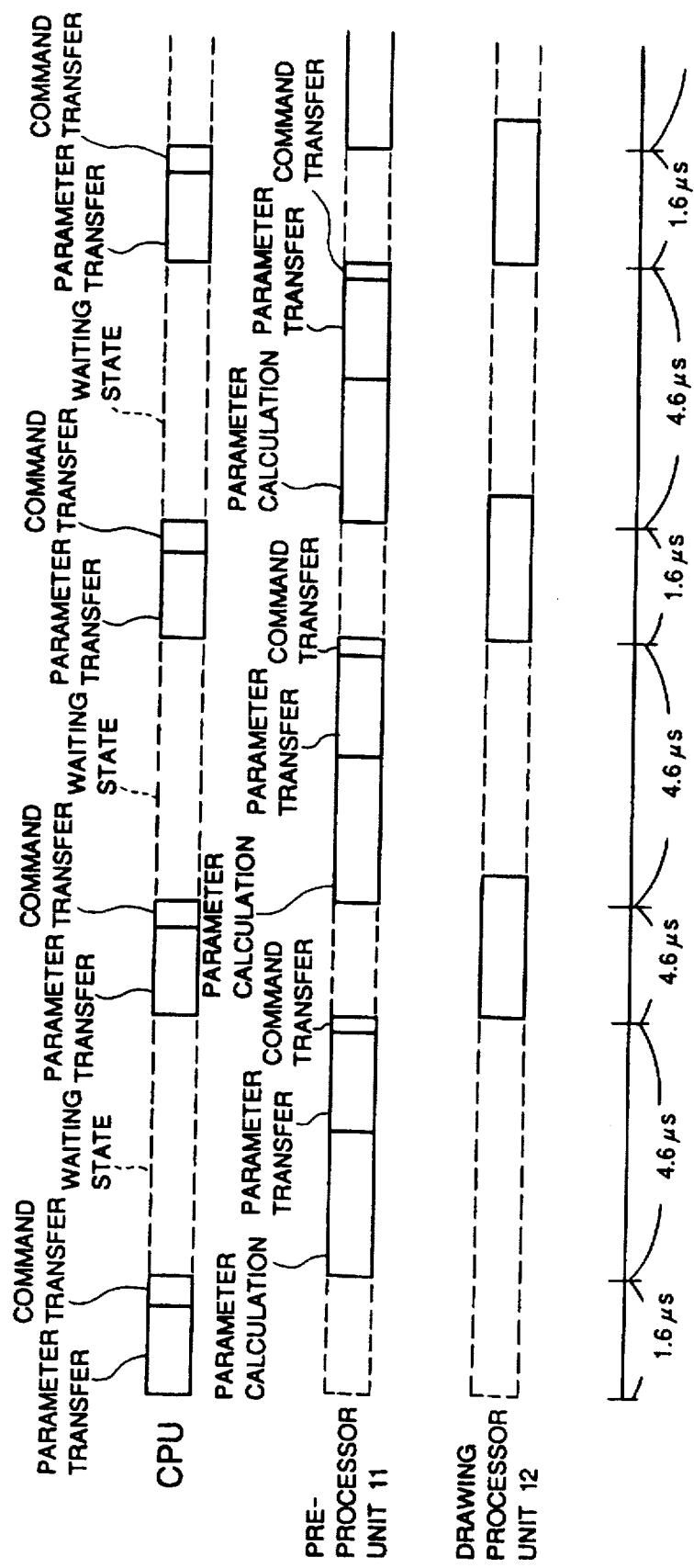
FIG. 9 is a time chart for use in describing another operation of the conventional information processing system illustrated in FIG. 1.

Referring to FIG. 9, let the conventional information processing system be operated on the above-mentioned conditions. Like in FIG. 7, illustration is made about an operation among the CPU, the pre-processor unit 11, and the drawing processor unit 12. In the illustrated example, the processing time of the drawing processor unit 12 is partially overlapped with either the processing time of the CPU or the processing time of the pre-processor unit 11 except for the last one of the one hundred straight lines and, as a result, does not appear apparently.

Taking the above into consideration, the processing time of the drawing processor unit 12 is given to draw the one hundred straight lines by:

$$(1.6 + 4.6) \times 100 + 3.0 = 623.0 \text{ (microseconds)},$$

on the assumption that the waiting time of the pre-processor unit 11 is determined by a transfer time of the parameter and the command data signals in the CPU and is equal to 1.6 microseconds.

Figure 10:
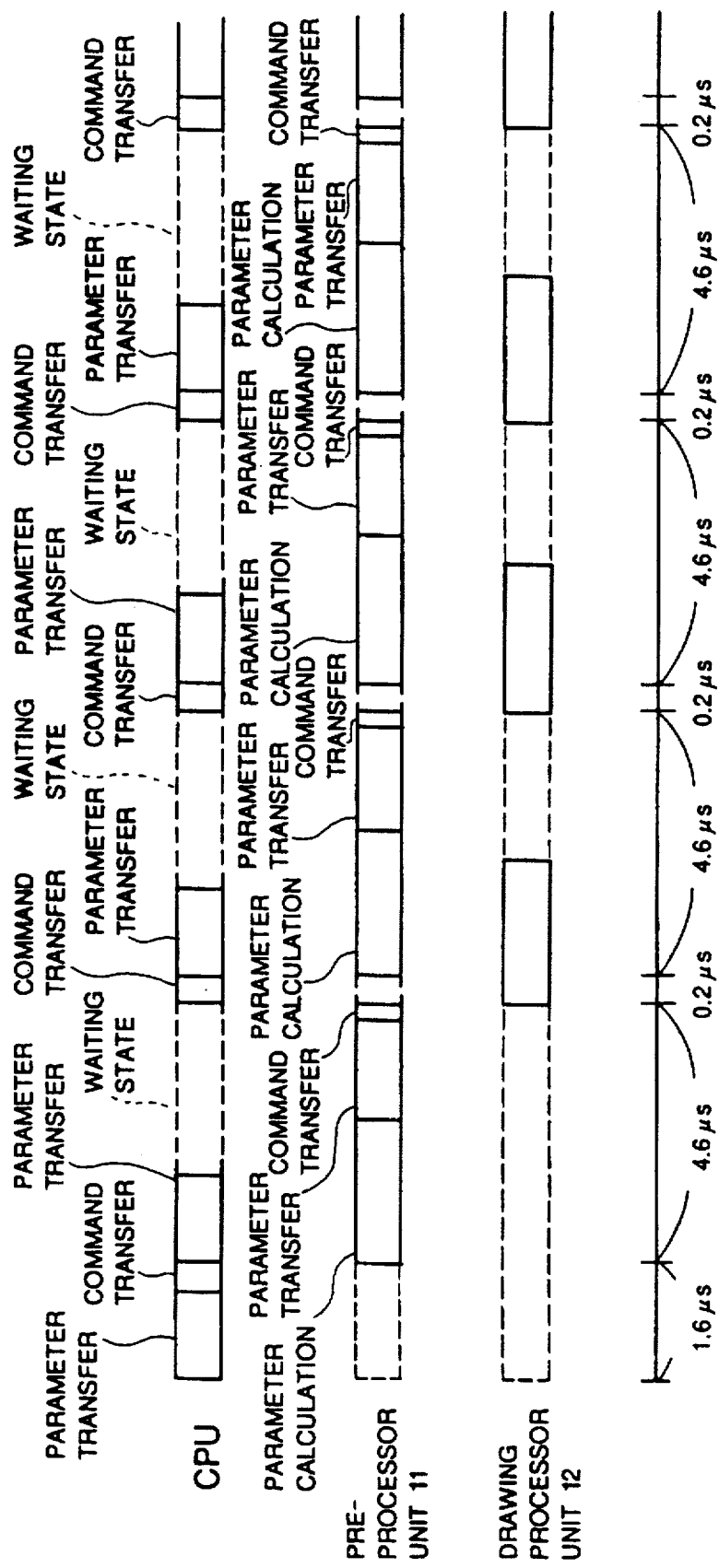
FIG. 10 is a time chart for use in describing another operation of the information processing system illustrated in FIG. 6.

Referring to FIG. 10, operation will be described as regards the information processing system illustrated in FIG. 6. It is to be noted that the waiting time of the pre-processor unit 11 lasts after transfer of a previous command data signal until reception of a following command data signal and is assumed to be equal to 0.2 microsecond.

Under the circumstances, a total processing time of the information processing system is shortened in comparison with the conventional information processing system by:

$(1.6-0.2) \times 99 = 138.6$ (microseconds).

Consequently, a practical total processing time for drawing the one hundred straight lines becomes equal to:

$623.0 - 148.5 = 484.4$ (microseconds).

Thus, the practical total processing time is reduced to 78% in comparison with the conventional information processing system. At any rate, it is possible to shorten the practical processing time by increasing a parallel processing time between the CPU and the pre-processor unit 11.

While this invention has thus far been described in conjunction with a few embodiments thereof, it will readily be possible for those skilled in the art to put this invention into practice in various other manners. For example, each of the pre-processor unit 11 and the drawing processor unit 12 may comprise first-stage and second-stage register sections so as to cope with the case where the processing time of the drawing processor unit 12 is longer or shorter than that of the pre-processor unit 11. In addition, a duplex structure of a register section, such as the first-stage and the second-stage register sections, may be adopted only in a register section related to a high speed processing and may not be adopted in a register section related to a low speed processing. With this structure, an increase of hardware can be minimized.

What is claimed is:

1. An information processing system comprising a first processor unit connected to a first bus and a second processor unit which is connected to said first processor unit through a second bus, each of said first and said second processor units comprising an instruction execution unit and a register unit which stores a parameter data signal and a command data signal indicative of a processing operation executed in each of said first and said second processor units, the instruction execution unit of each of said first and said second processor units supplying a busy signal onto each of the first and the second buses when the instruction execution unit is put into a busy state, the register unit of a selected one of said first and said second processor units comprising:

a first register section which is accessed by said selected one of the first and the second processor units and which is connected to a selected one of said first and said second buses to store at least said parameter data signal sent from said selected one of the first and the second buses, said first register section comprising a plurality of register portions connected to the selected one of the first and the second buses and storing at least said parameter data signal even when the instruction execution unit of the selected one of the first processor unit and the second processor unit produces said busy signal; and a second register section which is accessed by the instruction execution unit of said selected one of the first and the second processor units to transfer, together with said command data signal, the parameter data signal stored in the first register section to the second register section under control of the instruction execution unit of the selected one of said first and said second processor units and to store, as contents, the parameter data signal and the command data signal sent from said first register section, said second register section comprising a plurality of register portions which correspond to the plurality of the register portions included in the first register section, respectively;

the instruction execution unit of said selected one of the first and the second processor units executing the processing operation in accordance with said contents of the second register section and producing said busy signal when said contents are stored in said second register section of the selected one of the first and the second processor units.

2. An information processing system as claimed in claim 1, wherein said selected one of the first and the second processor units comprises the second processor unit while the selected one of the first and the second buses comprises the second bus.

3. An information processing system as claimed in claim 2, wherein the plurality of the register portions in said second register section of the second processor unit comprises:

a parameter register portion for storing said parameter data signal transferred from said first register section; and a command register portion for storing said command data signal sent through said first register section.

4. An information processing system as claimed in claim 3, wherein the plurality of the register portions in said first register section of the second processor unit further stores said command data signal along with said parameter data signal and comprises:

a first register portion coupled to said parameter register portion for storing the parameter data signal sent through the second bus; and a second register portion coupled to said command register portion for storing the command data signal sent through the second bus, to send the command data signal to said command register portion.

5. An information processing system as claimed in claim 1, wherein said selected one of the first and the second processor units comprises the first processor unit while the selected one of the first and the second buses comprises the first bus.

6. An information processing system as claimed in claim 5, wherein the plurality of the register portions in said second register section of the first processor unit comprises:

a parameter register portion for storing said parameter data signal transferred from said first register section; and a command register portion for storing said command data signal sent through said first register section.

7. An information processing system as claimed in claim 6, wherein the plurality of the register portions in said first register section of the first processor unit further stores said command data signal along with said parameter data signal and comprises:

a first register portion coupled to said parameter register portion for storing the parameter data signal sent through the first bus; and a second register portion coupled to said command register portion for storing the command data signal sent through the first bus to transfer the command data signal to said command register portion.

8. An information processing system as claimed in claim 1, wherein the other one of the first and the second processor units is different from the selected one of the first and the second processor units and further comprises:

first and second additional register sections each of which stores the parameter data signal and the command data signal which are transferred from said first additional register section to said second additional register section under control of the instruction execution unit included in the other one of the first and the second processor units.

9. An information processing system as claimed in claim 1, wherein said first processor unit is operable as a pre-processor unit which preliminarily processes the parameter data signal to produce a set of processed parameter data signals while said second processor unit is operable as a drawing processor unit which executes a drawing processing operation of the processed parameter data signals in accordance with said command data signal.

10. An information processing system for use in executing a drawing processing operation to draw a picture with reference to a parameter data signal and a command data signal which are sent from a host central processing unit and which are representative of parameters and commands necessary for drawing said picture and processing to be executed, respectively, said information processing system comprising:

a pre-processor unit connected to said host central processing unit through a first bus and supplied with said parameter data signal and said command data signal for preliminarily processing said parameter data signal with reference to said command data signal to produce a processed result signal representative of results of the preliminary processing in the pre-processor unit; and a drawing processor unit connected to said pre-processor unit through a second bus and supplied with said processed result signal and said command data signal for processing said processed result signal in accordance with said command data signal to draw said figure picture;

said pre-processor unit comprising an instruction execution unit and a register unit which stores the parameter data signal and the command data signal while said drawing processor unit comprises an instruction execution unit and a register unit which stores the processed result signal and the command data signal;

the instruction execution units of said pre-processor unit and said drawing processor unit supplying busy signals onto the first and the second buses when the instruction execution unit is put into a busy state, respectively;

the register unit of a selected one of said pre-processor unit and said drawing processor unit comprising:

a first register section which is connected to a selected one of the first and the second busses and which comprises a plurality of register portions for storing a selected one of said processed result signal and said parameter data signal even when the instruction execution unit of the selected one of the pre-processor unit and the drawing processor unit produces said busy signal; and a second register section which is accessed by the instruction execution unit of said selected one of the pre-processor unit and the drawing processor unit and which comprises a plurality of register portions corresponding to the plurality of the register portions of the first register section, respectively, in addition to a command register portion, the plurality of the register portions being for storing, as contents, the selected one of the processed result signal and the parameter data signal while the command register portion stores the command data signal, the instruction execution unit of said selected one of the pre-processor unit and the drawing processor unit executing the processing operation in accordance with said contents of the second register section and producing said busy signal when said contents are stored in said second register section of the selected one of the pre-processor unit and the drawing processor unit, the second register section being rewritten after the processing operation is completed in the instruction execution unit of the selected one of the pre-processed unit and the drawing processor unit.

11. An information processing system, comprising:

a first processor unit connected to a first bus; and a second processor unit connected to said first processor unit through a second bus, each of said first and said second processor units comprising an instruction execution unit and a register unit which stores a parameter data signal and a command data signal indicative of a processing operation executed in each of said first and said second processor units, the instruction execution unit of each of said first and said second processor units supplying the register unit with a load instruction after completion of the processing operation of the instruction execution unit, the register unit of a selected one of said first and said second processor units comprising:

a first register section which is accessed by said selected one of the first and the second processor units and which is connected to a selected one of the first and the second buses to store at least the parameter data signal sent from said selected one of the first and the second buses and to transfer the parameter data signal in response to the load instruction; and a second register section which is accessed by the instruction execution unit of said selected one of the first and the second processor units to receive the parameter data signal from the first register section to the instruction execution unit of the selected one of the first and the second processor units, wherein the instruction execution unit of the selected one of the first and the second processor units issues the load instruction to the first register section after the completion of the processing operation in the instruction execution unit to make the first register section transfer the parameter data signal to the second register section.

12. An information processing system as claimed in claim 11, wherein said selected one of the first and the second processor units comprises the second processor unit and the selected one of the first and the second buses comprises the second bus.

13. An information processing system as claimed in claim 12 wherein said second register section of the second processor unit comprises a plurality of the register portions comprising:

a parameter register portion for storing said parameter data signal transferred from said first register section; and a command register portion for storing said command data signal sent through said first register section.

14. An information processing system as claimed in claim 13 wherein said first register section of the second processor unit comprises a plurality of the register portions which store said command data signal along with said parameter data signal, said plurality of register portions comprising:

a first register portion coupled to said parameter register portion for storing the parameter data signal sent through the second bus; and a second register portion coupled to said command register portion for storing the command data signal sent through the second bus to send the command data signal to said command register portion.

15. An information processing system as claimed in claim 11, wherein said selected one of the first and the second processor units comprises the first processor unit and the selected one of the first and the second buses comprises the first bus.

16. An information processing system as claimed in claim 15, wherein said second register section of the first processor unit comprises a plurality of the register portions comprising:

a parameter register portion for storing said parameter data signal transferred from said first register section; and a command register portion for storing said command data signal sent through said first register section.

17. An information processing system as claimed in claim 16, wherein said first register section of the first processor unit comprises a plurality of the register portions which store said command data signal along with said parameter data signal, said plurality of register portions comprising:

a first register portion coupled to said parameter register portion for storing the parameter data signal sent through the first bus; and a second register portion coupled to said command register portion for storing the command data signal sent through the first bus to transfer the command data signal to said command register portion.

18. An information processing system as claimed in claim 11 wherein said first processor unit comprises a pre-processor unit which preliminarily processes the parameter data signal to produce a set of processed parameter data signals and the second processor unit comprising a drawing processor unit which executes a drawing processing operation of the processed parameter data signals in accordance with said command data signal.

19. An information processing system as recited in claim 1 wherein said second register section is rewritten after completion of said processing operation in each of said instruction execution units of said first processor unit and said second processor unit, respectively.

* * * * *